United States Patent [19]

Hennessy

[11] Patent Number: 5,142,712
[45] Date of Patent: Sep. 1, 1992

[54] VACUUM ASSISTED TOILET

[75] Inventor: Arnold Hennessy, Wellington, Canada

[73] Assignee: Fluidmaster, Inc., Los Angeles, Calif.

[21] Appl. No.: 618,170

[22] Filed: Nov. 26, 1990

[51] Int. Cl.⁵ .................................... E03D 11/00
[52] U.S. Cl. .................................... 4/431; 4/328
[58] Field of Search .................. 4/369, 424, 431, 328, 4/370-372

[56] References Cited

U.S. PATENT DOCUMENTS

| | | | |
|---|---|---|---|
| 255,485 | 3/1882 | Boyle | 4/328 |
| 380,854 | 4/1888 | Boyle | 4/424 X |
| 391,318 | 10/1888 | Harkins | 4/328 |
| 461,213 | 10/1891 | Boyle | 4/328 |
| 530,306 | 12/1894 | Harvey | 4/328 |
| 534,689 | 2/1895 | Hamilton | 4/424 X |
| 541,274 | 6/1895 | Hamilton | 4/424 |
| 558,130 | 4/1896 | Wallace | 4/328 |

Primary Examiner—Charles E. Phillips
Attorney, Agent, or Firm—Arthur Freilich; Robert D. Hornbaker; Leon D. Rosen

[57] ABSTRACT

A vacuum assisted toilet is described wherein a vacuum is applied to a toilet bowl outlet during flushing, which avoids malfunctions that could allow sewer gas to escape, and which uses flushing water effectively. The toilet bowl outlet includes upper and lower trap devices (40,44, FIG. 5) coupled by a trapway (42), with the lower trap device forming an unobstructed air passage when no water is moving therethrough but which includes a trapping region (64) that completely fills with water and forms an airflow barrier during flushing. The vacuum source includes a container (72, FIG. 1) in the toilet tank, with the container fixed in place in the tank to lie stationary therein, and with an ordinary flush valve (23) lying outside the container, so substantially the only part of the toilet that moves during flushing is the long developed and reliable flush valve. A baffle (110) separates a first tank portion (114) which holds the container and flush valve, from a second tank portion (116) which holds an inlet valve. The top (118) of the baffle lies a plurality of centimeters below the high water level (16), so that a lot of water passes into the toilet bowl at the beginning of flushing.

6 Claims, 5 Drawing Sheets

VACUUM ASSISTED TOILET

BACKGROUND OF THE INVENTION

Many cities are attempting to conserve water by reducing the amount of water used in each toilet flushing. One approach to reducing flush water while still assuring effective removal of toilet debris, is to apply a vacuum to the toilet bowl outlet near the beginning of each flushing, to suck out water and debris from the water closet into a drain pipe. One old patent, No. 380,854 to Boyle, issued Apr. 10, 1888, describes a vacuum assisted toilet which includes a container lying in the tank, with its bottom open to the rest of the tank and its top sealed. A vacuum conduit extends from the top of the tank to the toilet bowl outlet. When a person pulls a chain, he lifts the container to create a vacuum at its top, while simultaneously lifting a flush valve lying under the container. A vacuum created during lifting of the container produces a vacuum in the toilet outlet to assist flushing. The toilet outlet includes upper and lower traps that are always sealed against the passage of air, with the vacuum applied between the traps.

The system described in the Boyle Pat. No. 380,854 has several disadvantages, including the resistance to lifting a wide area tank against the vacuum created during such lifting, and the possibility that his two traps will allow all water from the toilet bowl to be siphoned into the drain. His system would violate present plumbing codes because of the possibility that sewer gas could leak into the environment. A vacuum assisted toilet of simple construction, which used a minimum of moving parts, and only those parts which have become highly reliable during years of refinement, and which complied with building codes against the possibility of sewer gas leakage, would be of considerable value.

SUMMARY OF THE INVENTION

In accordance with one embodiment of the present invention, a vacuum assisted toilet of relatively simple construction is provided, which is highly effective and reliable. The toilet includes a bowl outlet with a pair of trap devices and a trapway between them to which a vacuum is applied during flushing. One of the trap devices includes a trapping region that completely fills with water during flushing to provide a vacuum seal, but which is unobstructed to the flow of air along its top when no water is flowing therethrough, to prevent the possibility of siphoning out all water from the toilet bowl.

A container lies in the water tank, with a lower portion open to the tank and an upper portion connected to the vacuum conduit that extends to the trapway. The tank lies at a stationary, constant position in the tank, with a flush valve device lying outside the container and being substantially the only part of the toilet that moves during flushing. The lower portion of the container has a passage coupled to the tank, that forms a gas trap. A primarily vertical baffle extends across the width of the tank to divide it between a first compartment that includes the container and flush valve, and a second compartment that includes an inlet valve that allows water to fill the tank to a predetermined high water level. The top of the baffle is a plurality of centimeters below the high water level so a large water pressure is applied at the beginning of flushing, but thereafter only a small additional amount of water passes through the flush valve.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
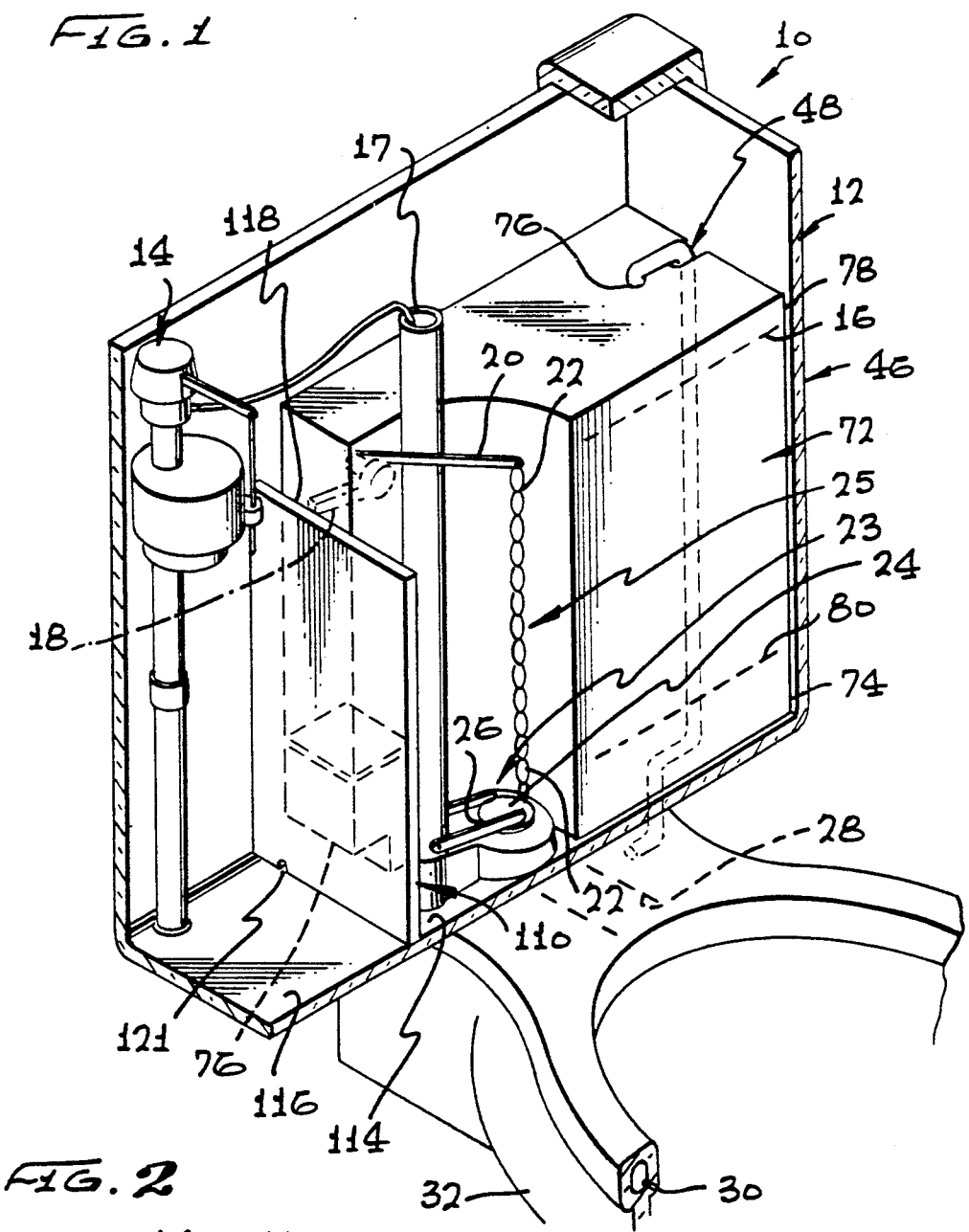
FIG. 1 is a partial isometric view of a vacuum assisted toilet constructed in accordance with one embodiment of the present invention.
Figure 5:
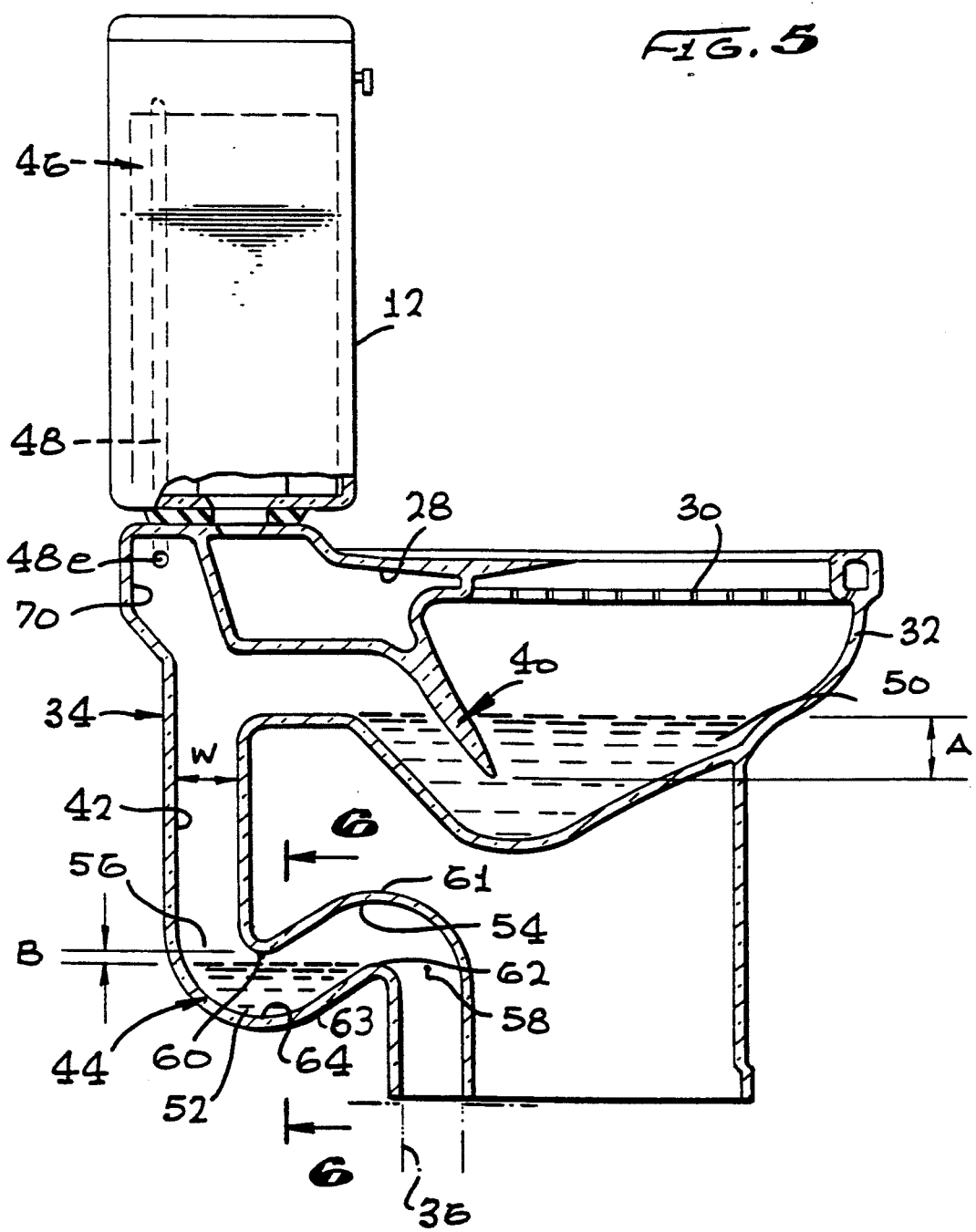
FIG. 5 is a sectional side view of the toilet of FIG. 1.
Figure 6:
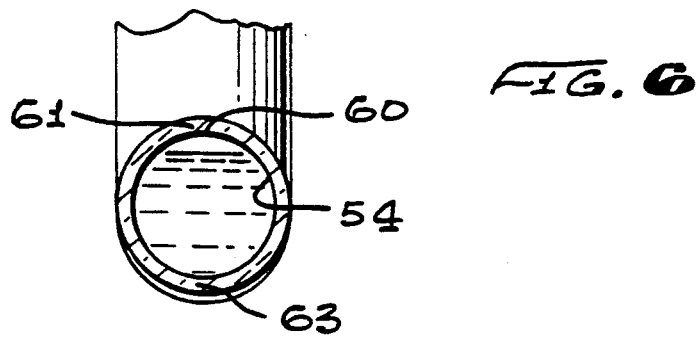
FIG. 6 is a view taken on the line 6—6 of FIG. 5.

FIG. 1 illustrates a vacuum assisted toilet 10 which includes a water closet or tank 12 that holds a conventional water inlet valve 14. The inlet valve dispenses water into the tank until it reaches a predetermined high water level 16, and also dispenses water through a refill tube 17 to fill the toilet bowl. When a handle 18 of a flush valve assembly 25 is manually operated, by pivoting it, a rod 20 and chain 22 are lifted to operate a flush valve 23 by pivoting a flush valve member 24 to lift it off a primarily upwardly facing flush valve seat 26. Water in the tank flows rapidly through the seat 26 and through a rim chamber 28 and toilet bowl orifices 30 into a toilet bowl 32. As shown in FIG. 5, the toilet bowl 32 has a toilet bowl outlet 34 that carries water and waste to a drain 36 that connects to a sewer system.

The toilet bowl outlet 34 includes an upper trap device 40 coupled to the bowl 32, a trapway 42 extending from the upper trap device, and a lower trap device 44 extending from the trapway to the drain 36. A vacuum source 46 is coupled through a vacuum conduit 48 to the trapway 42 to apply a vacuum therein during flushing of the toilet. The vacuum draws water and waste from a water pool 50 in the toilet bowl into the trapway 42, to efficiently flush out the contents of the bowl even when only a small quantity of water passes through the bowl during a flushing.

Most conventional toilets in households have a single trap device at 40, whose primary function is to prevent sewer gas from rising in the drain 36 and passing through the toilet bowl into the bathroom. The trap device 40 forms an air-tight, or gas-tight seal of a height A so the only route for gas to take into the bowl is filled with water. Present building codes generally require a seal height A of at least 2.5 inches (6.5 cm), although there are proposals to reduce this to 2 inches (5 cm). The lower trap device 44 does not form a gas-tight seal, except during flushing. The level of water in the lower trap device 44 lies a distance B that is about one half inch (about 1 cm) too low to form a gas-tight seal.

If the lower trap pool 52 were high enough to form a gas-tight seal even when there was no flushing, then there would be a danger that the two traps together could form a siphon that siphoned all of the water out of the toilet bowl 32 at the end of a flushing. Of course, this could lead to the danger of sewer gas spreading through the toilet bowl into the bathroom. While a gas-tight seal must be avoided between flushings, it is also necessary that there be a gas-tight seal at the lower trap device 44 near the beginning of flushing, in order that the vacuum assist can operate.

The lower trap device 44 includes a fluid trap conduit 54 with at least a portion extending with an upward directional component away from the bottom of the trapway 42. The conduit 54 has an upstream end 56 coupled to the generally vertical trapway and forming a trapping region 64 that holds a lower trap pool 52. The fluid trap conduit also has a downstream end 58 coupled to the drain 36. The uppermost location 60 along the top wall 61 of the conduit at its upstream end 56, lies higher than the highest location 62 of the bottom wall 63 of the conduit at the downstream end of the conduit. This results in the gap of height B between the top of the lower trap pool 52 and the uppermost wall of the conduit, to prevent the establishment of a gas-tight seal thereat. Gas can flow along the top of the trap conduit to prevent any siphoning out of water after a flushing is completed.

The distance B is preferably small, and less than half the width W of the trapway 42 and of the fluid trap conduit 54. The traps and trapway generally have a considerable minimum width such as 2¼ inches (5.7 cm) to assure the reliable flow of debris therethrough. When the toilet is flushed, so water begins to flow through the lower trap conduit 54, the water level therein rises to a level above the location 60, to form a gas-tight seal. As a result, a vacuum applied through the vacuum conduit 48 to the trapway 42 is not dissipated, and results in forcefully drawing, or siphoning, water out of the toilet bowl, so that less water is required for effectively removing debris from the toilet bowl. The rate of water flow required to increase the height of water above the uppermost location 60 depends upon the height B of the "negative seal" when the water is still. A small height B such as one-half inch (1.3 cm) is desirable so that a vacuum can be established in the trapway near the very beginning of flushing when water first flows out of the toilet bowl.

The end 48e of the vacuum conduit can be placed anywhere that it is in direct communication with the trapway 42. Applicant prefers to make the connection in a cavity 70 lying above the path of water flowing through the trapway to resist the entrance of water into the vacuum conduit.

Figure 4:
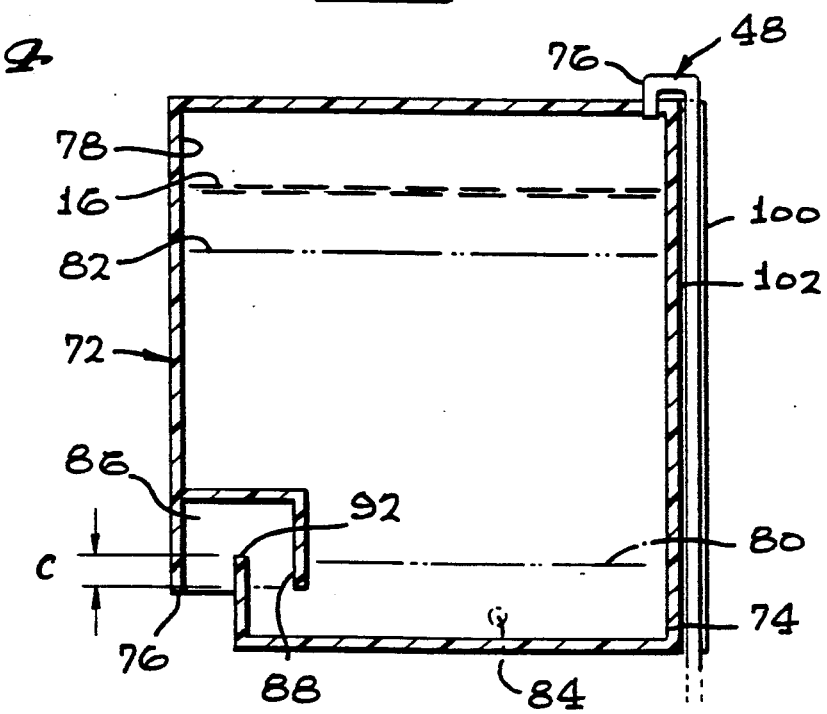
FIG. 4 is a sectional view of the container of FIG. 3.

FIG. 1 shows that the vacuum source 46 includes a container 72 lying in the tank 12. The container is sealed from the rest of the inside of the tank 12, except at a lower container portion 74 that has an opening 76 open to the tank. The vacuum conduit 48 has an end 76 coupled to an upper portion 78 of the container, in which a vacuum is created during flushing. After a flushing, when water from the inlet valve 14 fills the tank to the high water level 16, the water level in the container 72 also rises to the high water level 16. When a person operates the handle 18 to open the flush valve 23, water in the tank flows rapidly down through the flush valve into the toilet bowl and out through the toilet bowl outlet. The water level in the tank quickly drops, over a period of a few seconds, until it is a few inches above the flush valve seat 26, at which time the floating flush valve member 24 moves down with flowing water towards the valve seat to close it. At that time the water has fallen to a low water level 80. During the fall in tank water level, the level of water in the container 72 tends to also fall, but is prevented from falling very far because the upper portion of the container is sealed. Until a vacuum is established at the lower trap in the toilet bowl outlet, air can flow into the top of the container, but thereafter a vacuum is created in the container. The vacuum created in the upper portion of the container communicates through the vacuum conduit 48 to the trapway to assist in flushing FIG. 4 shows the inside of the container 72, showing how the water level drops from the high water level 16 to a low container water level 82, to create a vacuum in the upper portion 78 of the container.

When a flushing is completed and water in the tank rises to the high water level 16, air in the upper portion 78 of the container must be expelled. Such expulsion of air occurs through the vacuum conduit 48, and through the lower trap device 44 (FIG. 5) which is now unsealed.

If the lower portion 74 of the container communicated with the rest of the tank inside through a simple hole such as indicated at 84, there would be a danger that sewer gas could leak out in the event that water in the tank decreased below the low water level 80. This could happen, for example in the event that the tank was drained for repair of the inlet valve or for some other reason not directly concerned with the container. To prevent such possibility of sewer gas leakage, applicant provides a passage 86 with a trap 88 connecting the lower portion 74 of the container to the tank. The trap is formed by a passage part that extends upwardly from the inside of the container toward the opening 76 that opens to the tank. The height C of this trap prevents the passage of sewer gas, entering the container through the vacuum conduit 48, from passing into the rest of the tank and then into the bathroom. Even if all water in the tank drains out, water will remain in the container at a level equal to the height of the top 92 of the trap. It requires sewer gas at a pressure equal to C inches of water to pass through the trap. Building codes generally require that a water seal always be present to prevent the escape of sewer gas even in the event that the sewer gas is at a pressure of up to two or two and one half inches of water. The height C of the seal is at least two or two and one half inches (5.1 cm to 6.4 cm) to prevent such escape.

The vacuum conduit 48 must extend along most of the height of the tank and below it, between its end 76 that connects to the inside of the upper portion of the container, and its lower end which connects to the trapway. It would be possible to have the conduit extend along the inside of the container to its lower end, and then down through the bottom of the tank, but this would require a seal at the bottom of the container and another seal at the bottom of the tank. It would also be possible to have the vacuum conduit extend without support along the height of the inside of the tank, but this would subject the vacuum conduit to damage and also require additional space. Applicant prefers to form the container with an end 100 that lies furthest from the inlet valve, with a tube-holding recess 102 extending vertically along the height of the container to its bottom. The vacuum conduit is a tube that extends along the outside of the container but down along the recess 102 and then through the bottom of the tank. As a result, very little additional tank volume is occupied by the vacuum conduit, and yet it is protected against damage both during installation and afterwards.

Figure 2:
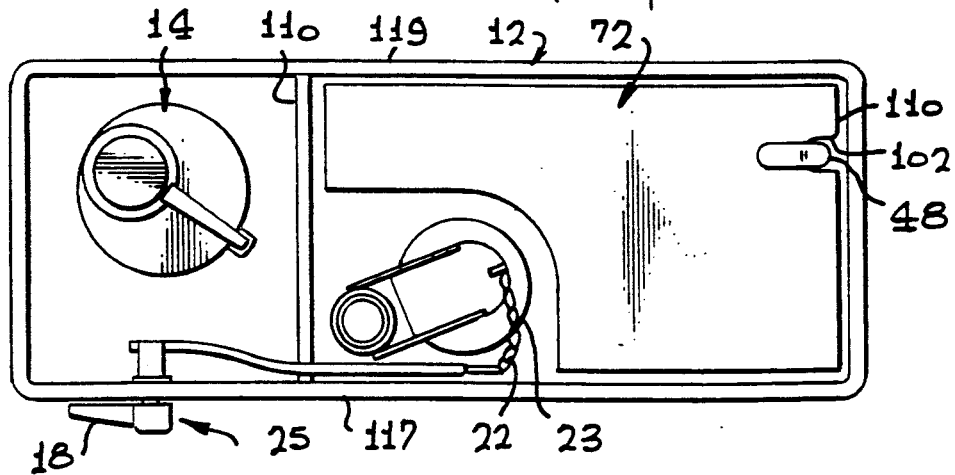
FIG. 2 is a plan view of the water tank of the toilet of FIG. 1, with the cover removed.
Figure 3:
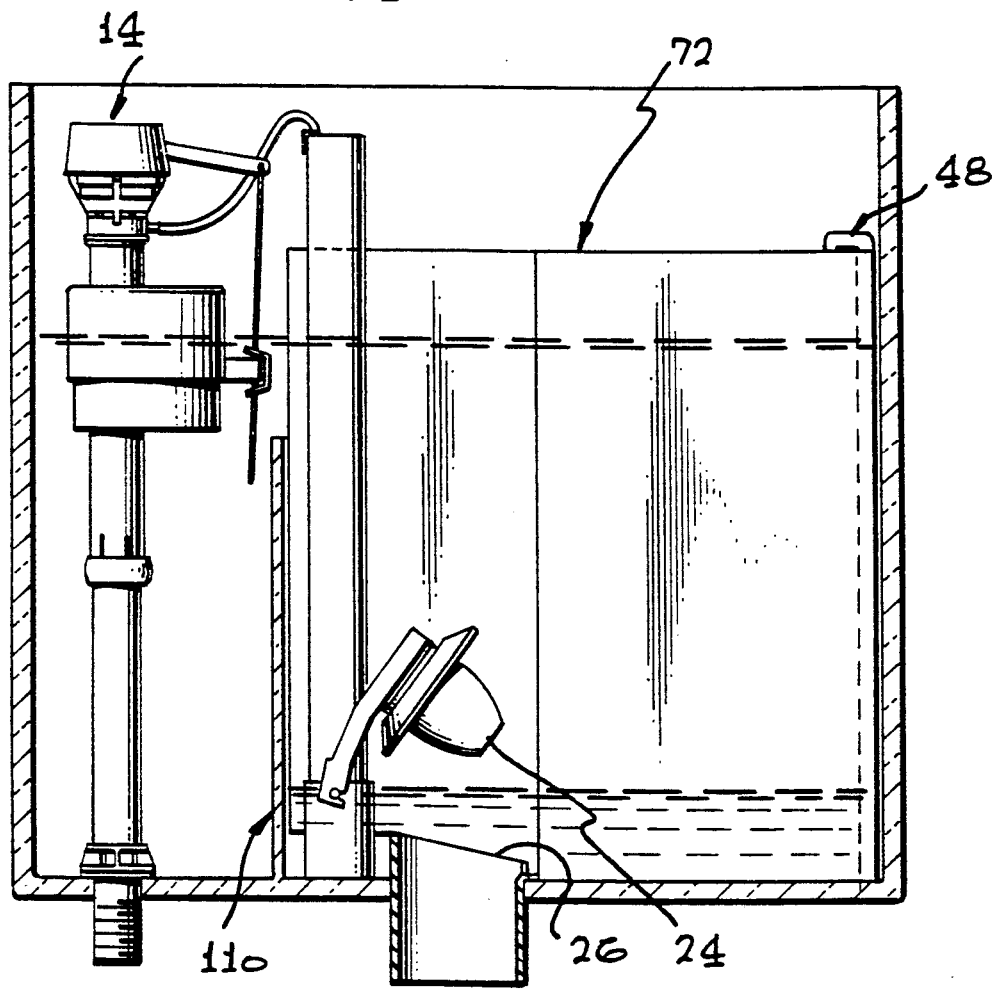
FIG. 3 is a sectional front view of the view of the tank of FIG. 1.

As shown in FIG. 1, the toilet includes a baffle 110 which divides the tank into two horizontally-spaced compartments 114, 116. The first compartment 114 includes the flush valve 23 and the container 72, while the second compartment 116 contains the inlet valve 14. The baffle extends between the opposite front and rear walls 117, 119 (FIG. 2) of the tank, and has a bottom at the bottom of the tank and a top at 118. The height of the top 118 of the baffle is a plurality of centimeters below the high water level 16 in the tank. Thus, when the tank is full, water in the first and second compartments merge, while when the water level drops below the top of the baffle, water in the two compartments are separate. (A small baffle hole at 121 allows draining the entire tank during maintenance, but has no significant effect during flushing).

When a flushing starts, water at the top of both compartments 114, 116 is available to pass towards the flush valve. As a result, there is only a small decrease in the water pressure or head during perhaps the first half second after the valve member is raised to produce a rapid initial flow of water into the toilet. This rapid water flow results in a rapid flow of water through the lower trap device to seal it against the passage of air therethrough. When the water level in the tank drops below the top 118 of the baffle, the water in the second compartment 116 is isolated from the first compartment, and only water in the first compartment 114 passes through the flush valve. The amount of water in the first compartment 114 is limited largely by the considerable volume occupied by the container 72. A water tank may hold perhaps four gallons of water when filled to its high water level 16, and dispense 3.5 gallons in a flushing in the absence of the baffle and container. However, the presence of the baffle and container results in much less water being dispensed in each flushing, such as only 1.5 gallons. Thus, considerable water is saved, as compared to flushing without the container-/or baffle, and yet effective removal of debris from the toilet bowl if obtained, largely due to the vacuum assist. Applicant can vary the amount of water dispensed in each flushing by making the height of the baffle adjustable.

The container 72 lies stationary in the tank, and has no moving parts. The only moving parts involved in flushing the toilet include the flush valve assembly 25 which includes the pivoting handle 18, rod 20, chain 22, and flush valve member 24. These parts have been used and their design refined over many years, so that reliable flush assemblies are available at moderate cost. It may be noted that the inlet valve 14 also has moving parts, but these are no different than for any other toilet.

Figure 7:
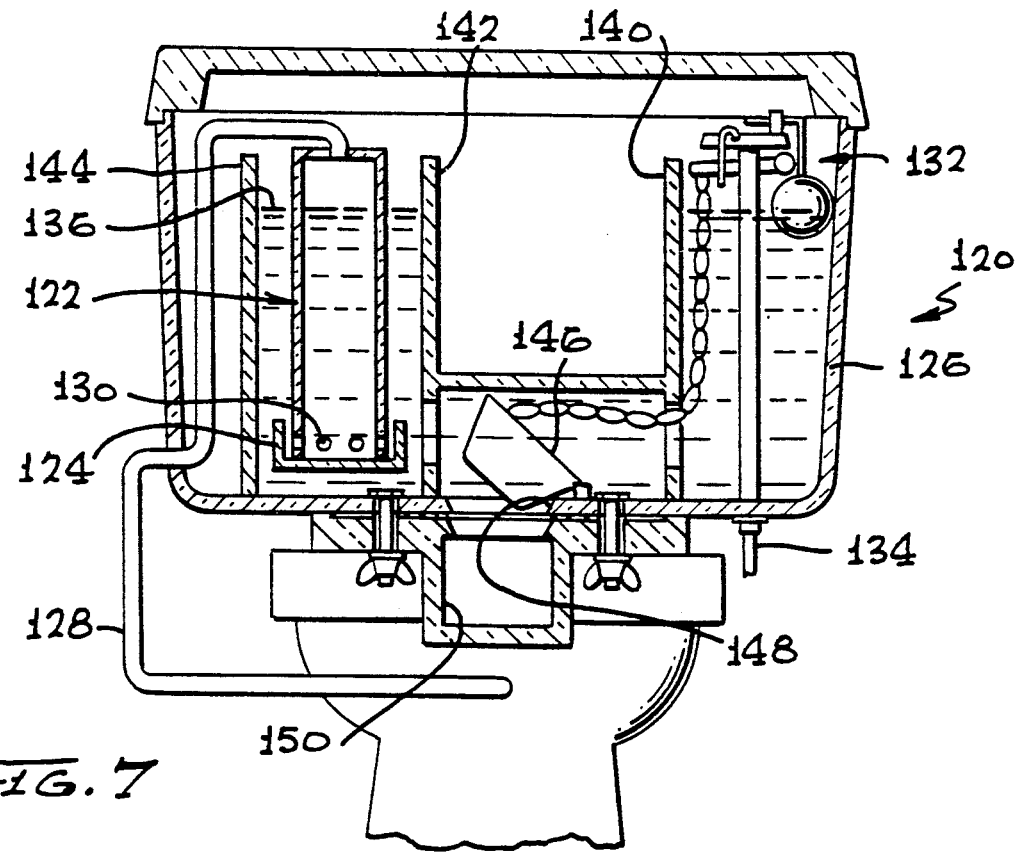
FIG. 7 is a rear sectional view of a vacuum assisted toilet constructed in accordance with another embodiment of the invention.

FIG. 7 illustrates another vacuum assisted toilet 120 which includes a container 122 with its bottom open and resting on an open pan 124 lying in a water closet or tank 126. A vacuum conduit 128 is connected to the top of the container 122, and has a lower end connected to a trapway as earlier described. The container has apertures 130 lying below the top of the pan 124, to communicate with the inside of the tank through the gap between the container and pan. The toilet has an inlet valve 132 that receives water from an inlet pipe 134 and fills the tank to a high water level at 136. Partitions 140, 142, and 144 form a limited volume within the tank for holding water, and leave empty some parts of the tank that would otherwise hold water. Water from around the inlet valve 132 and from around the container 122 can pass through a flush valve 146 and through a valve seat 148 into a rim chamber 150 leading to the toilet bowl. When the flush valve 146 is open and the water level drops, a vacuum in the upper portion of the container 122 is coupled through the vacuum conduit 128 to the trapway to aid in flushing as described above. The distance between the top of the apertures 130 and the top of the pan 124 forms a seal that prevents the escape of sewer gas into the tank and into the washroom containing the toilet.

Figure 8:
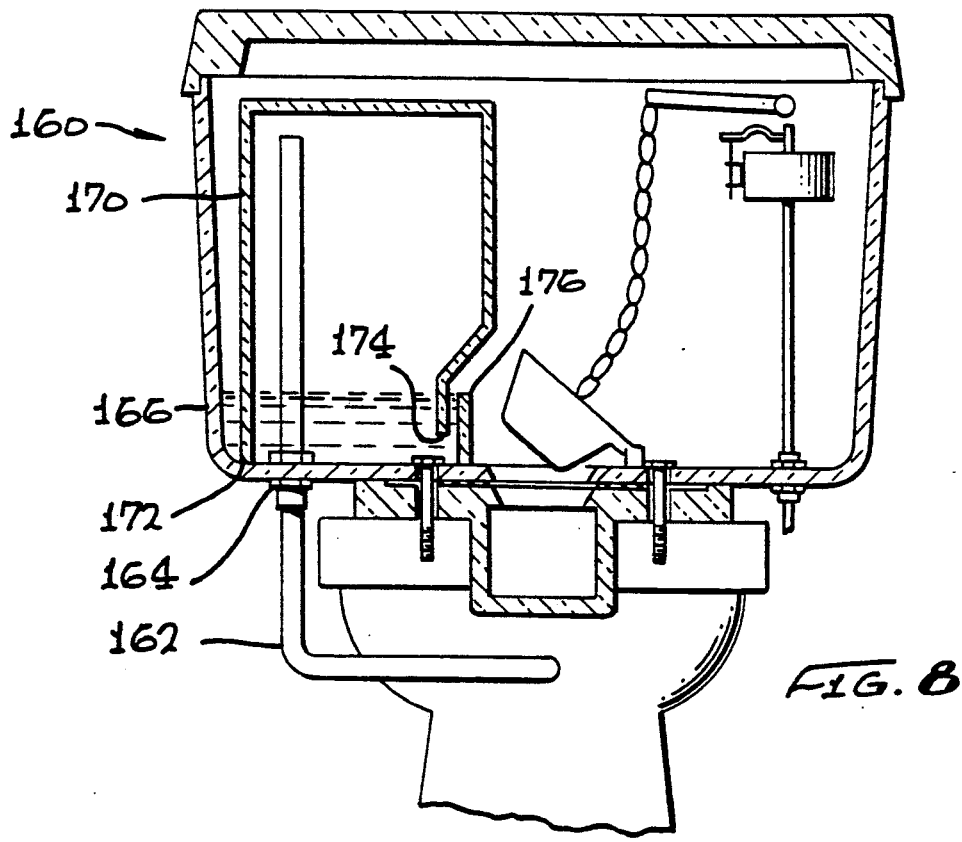
FIG. 8 is a sectional rear view of a vacuum assisted toilet constructed in accordance with yet another embodiment of the invention.

FIG. 8 shows a vacuum assisted toilet 160 which is a variation of the toilet of FIG. 7. The toilet 160 includes a vacuum conduit 162 that extends through a water tight connection 164 at the bottom of the tank 166 directly into a container 170 having an open bottom 172 resting on the bottom of the tank. The container has a cutaway 174 at its bottom edge that allows water to flow in and out of the container. A small weir 176 extending across a bottom portion of the tank, creates a water seal around the bottom of the container. As a result, if the rest of the reservoir should drain out completely, there will be a water seal to prevent the escape of sewer gas.

Figure 9:
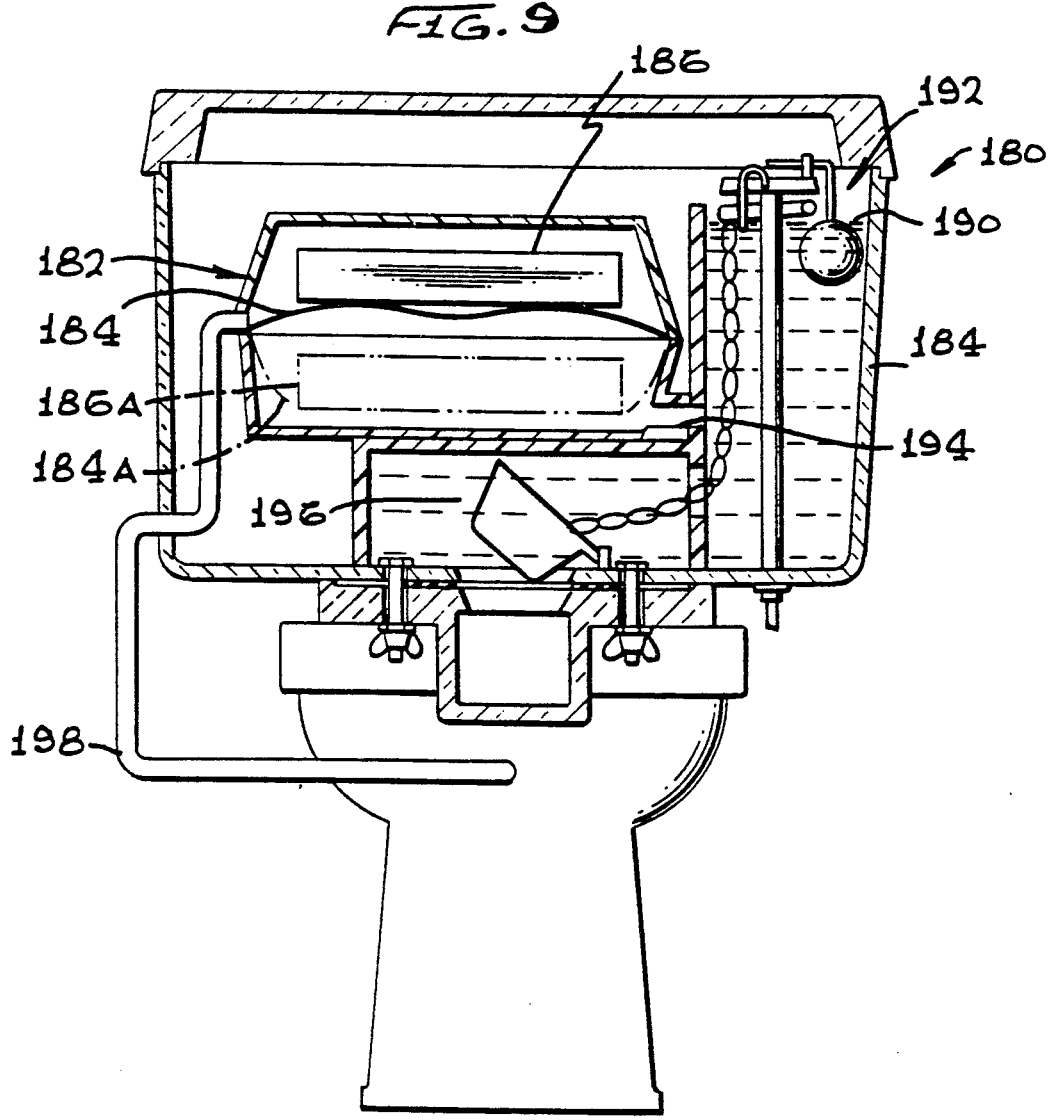
FIG. 9 is a sectional rear view of another vacuum source which can be used with the toilet of FIG. 8.

FIG. 9 illustrates another vacuum assisted toilet 180 which includes a container 182 located inside a tank 184. A flexible air-impervious diaphragm 184 separates the container into upper and lower parts. A weight 186 in the upper part lies on the diaphragm and tends to fall to the position 186A wherein it depresses the diaphragm to the position 184A. The diaphragm is a plurality of centimeters below the high water level 190 in the tank, that is established by the inlet valve 192. The lower half of the container is connected by a water duct 194 to the water-containing part of the tank. As a result, when the tank is filled with water the lower half of the container is also filled with water and the diaphragm is forced upwardly to the position 184 and lifts the weight. The height of the container 182 relative to the high water level and the mass of the weight 186 are chosen so that the weight will be lifted to the position shown when the tank is filled. When a flush valve 196 is opened, and the water level drops, the weight 186 pushes down the diaphragm rapidly, to create a vacuum in the upper container part that is transmitted through a vacuum conduit 198 to the trapway of the toilet outlet as described above. The weight produces a greater vacuum and produces it earlier during the flushing operation, than if only the weight of water is used to create the vacuum. However, it has the disadvantage of requiring additional parts that move, which can increase cost and require great care in design and manufacture to maintain high reliability. Instead of using a weight as a mechanical storage device that presses down on the diaphragm, it is possible to use springs to push down the diaphragm.

Figure 10:
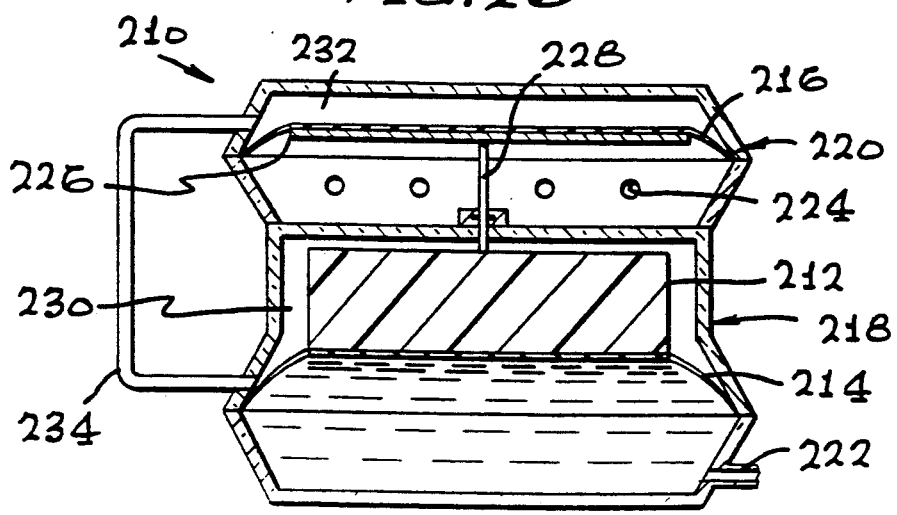
FIG. 10 is a rear sectional view of still another vacuum source that can be used with the toilet of FIG. 8.

FIG. 10 illustrates a vacuum source 210 which is a variation on the vacuum source of FIG. 9. In FIG. 10, a heavier weight 212 is provided, which causes the simultaneous displacement of two flexible diaphragms 214, 216, each lying within a different container 218, 220 and dividing its respective container into upper and lower parts. The lower part of the lower container 218 is connected to water in the tank through a passageway 222. The lower part of the upper container 220 is opened to the atmosphere, as through vents 224, the containers lying high enough in the tank so the vents 224 lie above the high water level. The upper diaphragm 216 is connected through a rigid plate 226 and push rod 228 to the weight 212. As a result, when the toilet is flushed the weight presses down on the lower diaphragm 214 to provide a vacuum in the upper part 230 of the lower container, as well as to produce a vacuum in the upper part 232 of the upper container. These parts of the two containers in which vacuums are produced, are connected to a vacuum conduit 234 that is connected to the trapway as discussed above. With the two diaphragms simultaneously displaced, a greater volume of air is displaced in the same time period, to increase the effectiveness of the partial vacuum in aiding in flushing out water and debris in the toilet bowl.

Thus, the invention provides a vacuum assisted toilet which is highly effective in flushing a toilet bowl with a minimum of water, and which securely guards against the accidental release of sewer gas. The toilet bowl outlet includes a pair of trap devices connected by a trapway. One the trap devices, preferably the lower one, includes a trap conduit through which water and debris can move during flushing, which includes a trapping region that completely fills with water when water flows rapidly therethrough during flushing to prevent the passage of air so as to maintain a vacuum in the trapway. However, the trapping region is unobstructed to the flow of air therethrough along its top when no water is flowing through the trapping region, to avoid the possibility of siphoning off all the water from the water closet. A vacuum source includes a sealed container lying in the tank and having a lower portion communicating with the rest of the tank, so the drop in tank water level during flushing creates a vacuum in the top portion of the container which is coupled through a vacuum conduit to the trapway. The container is fixed in place in the tank to lie stationary therein, and the flush valve is horizontally spaced from the bottom of the container to lie outside the container. The only moving part of the toilet (other than the inlet valve) during flushing is the flush valve assembly, which can be a conventional highly reliable type. The container forms a trap constructed so that even if all water is emptied from the tank, there is a water barrier preventing the passage of sewer gas that might enter the top of the container, into the tank. A baffle divides the tank into horizontally spaced compartments, with the top of the baffle being a plurality of centimeters below the high water level in the tank, to provide an initial high flow rate of flush water to the toilet bowl, and only a small flow of water thereafter to conserve water.

Although particular embodiments of the invention have been described and illustrated herein, it is recognized that modifications and variations may readily occur to those skilled in the art, and consequently it is intended that the claims be interpreted to cover such modifications and equivalents.

I claim:

1. In a toilet which includes a tank, a toilet bowl, a tank inlet valve through which water is received into the tank up to a predetermined high water level, a tank flush valve through which water in the tank is flushed into the bowl, a toilet bowl outlet, and a vacuum source coupled to said outlet to apply a vacuum therein during flushing, the improvement wherein:

said vacuum source includes a container lying in said tank and having upper and lower portions, with said upper portion being sealed from said tank and said lower portion having an opening leading to water in said tank, so that when the tank water level around said container opening drops during flushing a vacuum is created in said container upper portion, said vacuum source also including a vacuum conduit extending between said container upper portion to said toilet outlet to apply a vacuum that aids in moving material through said outlet; and including a baffle which divides said tank into two horizontally-spaced compartments, including a first compartment that includes said flush valve and said container opening, and a second compartment, said baffle having a bottom at the bottom of said tank and a top at a height that is a plurality of centimeters below said high water level, with the volumes of said compartments above said baffle merging, whereby when a flushing starts, water from above both compartments passes toward said flush valve, but when the water level drops below the top of the baffle substantially only water in said second compartment passes toward said flush valve.

2. The improvement described in claim 8 wherein:

said toilet outlet includes upper and lower trap devices and a trapway connecting them, said upper trap device forming a water trap with a height of a plurality of centimeters to present the passage of sewer gas therethrough, and said lower trap device including a trap conduit with upper and lower walls and with the lower wall forming a trap region that holds a pool of still water to a maximum height that is below the bottom of said upper wall so as to allow gas to pass through said lower trap device above said pool of water when no water is flowing through said trap conduit, while allowing the level of water in said trap conduit to rise above the bottom of said upper wall during flushing when water flows rapidly through said trap conduit.

3. A toilet which includes a tank, a toilet bowl, a tank inlet valve through which water is received into the tank, a flush valve through which water in the tank is flushed into the bowl, and a toilet bowl outlet which includes an upper trap device extending from said bowl, a trapway extending downwardly from said upper trap device, and a lower trap device extending from the trapway to a drain, the toilet also including flush assist apparatus which includes a vacuum source located in said tank and coupled to said trapway to apply a vacuum therein during flushing;

said vacuum source includes a vacuum producing container which creates a vacuum responsive to movement of tank water out of said flush valve;

said tank has opposite vertical walls, and said inlet valve allows water to rise in said tank to a predetermined high water level; and including;

a baffle which extends between said tank opposite walls to divide said tank into two compartments, including a first compartment in which lies said container and said flush valve, and a second compartment in which lies said inlet valve;

said baffle has an upper end that lies a plurality of centimeters below said high water level.

4. A vacuum assist toilet for connection to a drain comprising:

a toilet tank within which water is held which drops in height during a toilet flushing, said tank having a lower portion;

a toilet bowl which can be flushed, said bowl having an upper portion;

a flush valve coupling said tank lower portion to said bowl upper portion;

a toilet bowl outlet which includes an upper trap device extending from said bowl, a trapway extending generally downwardly from said upper trap device, and a lower trap device extending from said trapway to extend to said drain;

a vacuum source located substantially in said tank and which is coupled to said trapway and which applies a vacuum thereto, in response to the drop in water level in sand tank during at least part of the time when water flows from said flush valve into said toilet bowl;

said lower trap device includes a trapping region that is unobstructed to the flow of gas therethrough along its top when no water is flowing through said trapping region, but that completely fills with water when water flows rapidly therethrough from said toilet bowl outlet through said trapway during flushing, to contain said vacuum in said trapway so said vacuum can help draw water and debris out of said toilet bowl.

5. The toilet described in claim 4 wherein:

all of the water flowing out of said flush valve flows into said toilet bowl, whereby to use all water to help carry debris out of said toilet bowl.

6. The improvement described in claim 4 wherein:

said flush valve is of the type that includes a primarily upwardly facing valve seat, a pivotally mounted valve member that can pivot from a closed position against said seat to an open position above said seat, and a flush handle pivotally mounted on said water tank and coupled to said valve member to raise it off said seat;

said vacuum source includes a container with upper and lower portions lying stationary completely within said tank and having only a lower container portion communicating with the rest of the tank so the drop in tank water level during a flushing creates a vacuum in the top portion of the container, said vacuum source also including a conduit coupling the upper portion of said container to said trapway;

said flush valve is horizontally spaced from the bottom of said container to lie outside said container, and said container forms a passage coupling its lower portion to the inside of said tank.

* * * * *

UNITED STATES PATENT AND TRADEMARK OFFICE
CERTIFICATE OF CORRECTION

PATENT NO. : 5,142,712
DATED : September 1, 1992
INVENTOR(S) : Arnold Hennessy

It is certified that error appears in the above-identified patent and that said Letters Patent is hereby corrected as shown below:

column 8, line 26, change "8" to --1--.

column 9, line 18, after "level in" change "sand" to --said--.

Signed and Sealed this

Fifth Day of October, 1993

*Attest:*

BRUCE LEHMAN

*Attesting Officer*        *Commissioner of Patents and Trademarks*